United States Patent [19]
Baude et al.

[11] Patent Number: 5,114,220
[45] Date of Patent: May 19, 1992

[54] MULTIPLE CONTOUR DIFFRACTIVE LENS

[75] Inventors: Dominique Baude, Saint Ouen; Pierre Chavel, Chilly Mazarin; Denis Joyeux, Les Ulis; Jean Taboury, Sceaux, all of France

[73] Assignee: Essilor International, Compagnie Generale d'Optique, Creteil, France

[21] Appl. No.: 351,968

[22] Filed: May 15, 1989

[30] Foreign Application Priority Data

May 19, 1988 [FR] France .................. 88 06699

[51] Int. Cl.⁵ .............................................. G02C 7/04
[52] U.S. Cl. ........................... 351/160 R; 351/161
[58] Field of Search ............. 351/160 R, 160 H, 161; 350/162.16, 162.22, 452

[56] References Cited

U.S. PATENT DOCUMENTS 4,210,391 7/1980 Cohen ................................ 351/161
4,637,697 1/1987 Freeman ........................... 351/161

Primary Examiner—Paul M. Dzierzynski
Attorney, Agent, or Firm—Blakely, Sokoloff, Taylor & Zafman

[57] ABSTRACT

Disclosed is an ophthalmic lens which characteristically comprises at least two concentric regions having diffractive components with different phase profiles in order to use different orders of diffraction. The diffractive components may be formed by holograms in relief or index holograms.

37 Claims, 8 Drawing Sheets

Prior art
FIG_1A
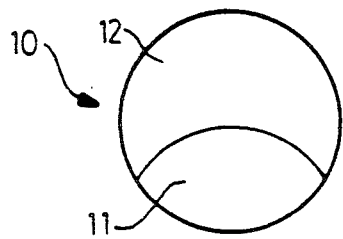
FIG_1B
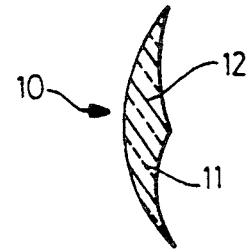
FIG_2A
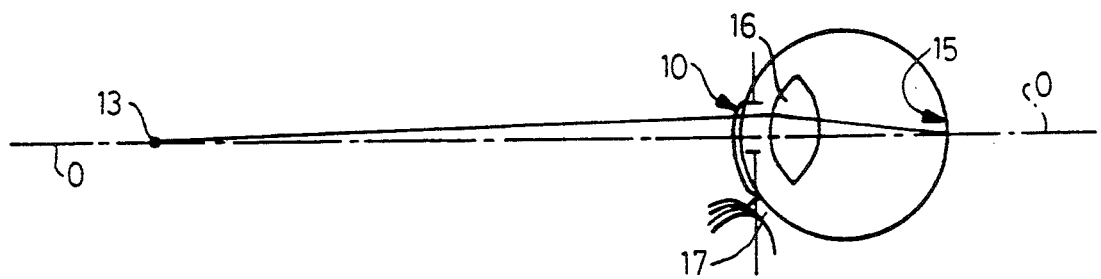
FIG_2B
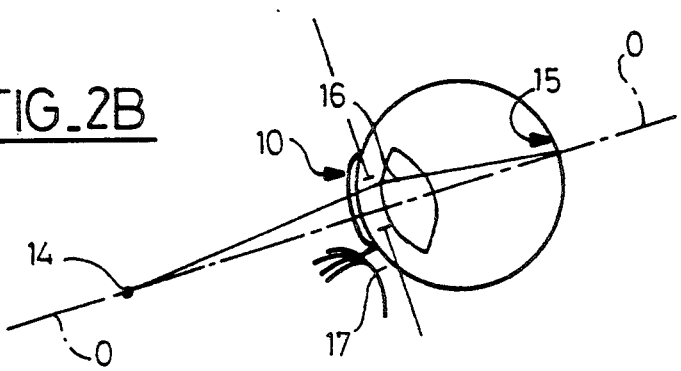

Prior art
FIG_3A
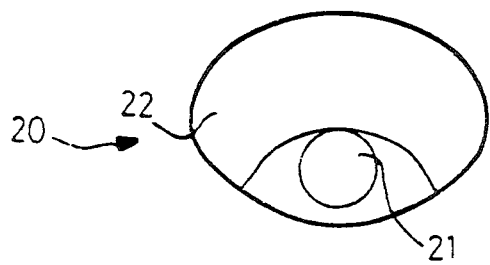
FIG_3B
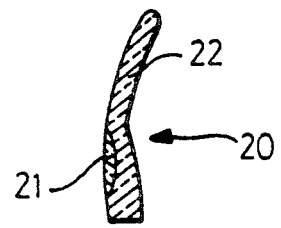
FIG_4A
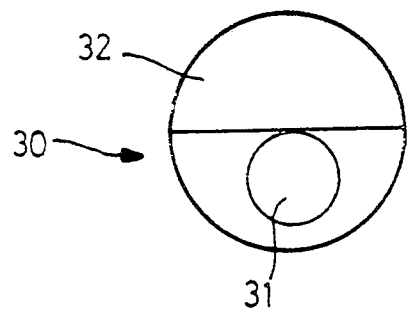
FIG_4B
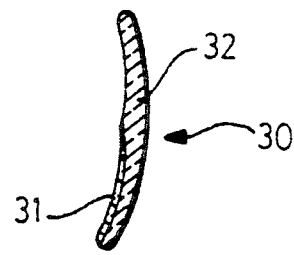
FIG_5A
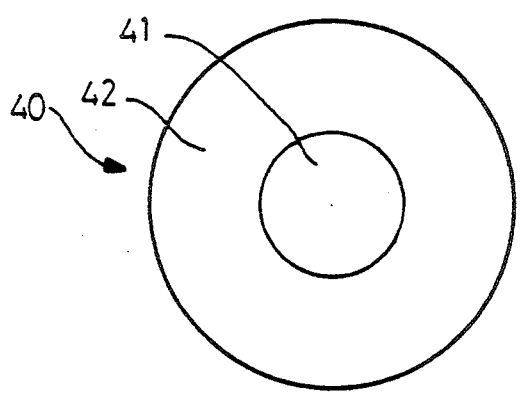
FIG_5B
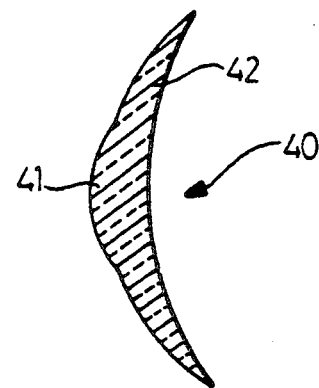

Prior art
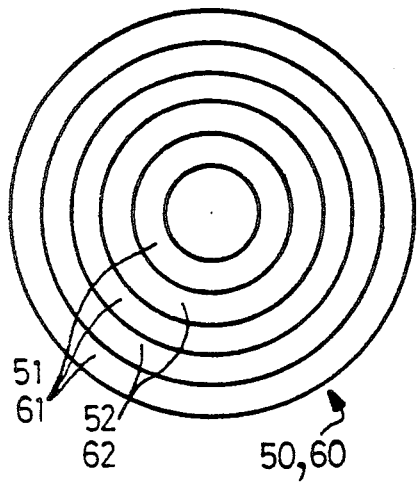
FIG._6A
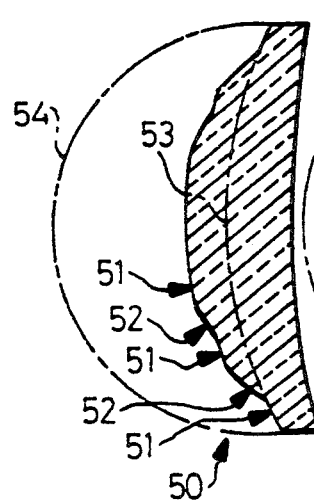
FIG._6B
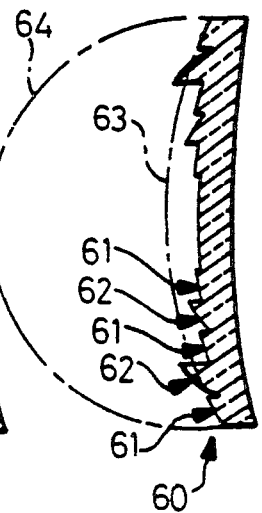
FIG._6C
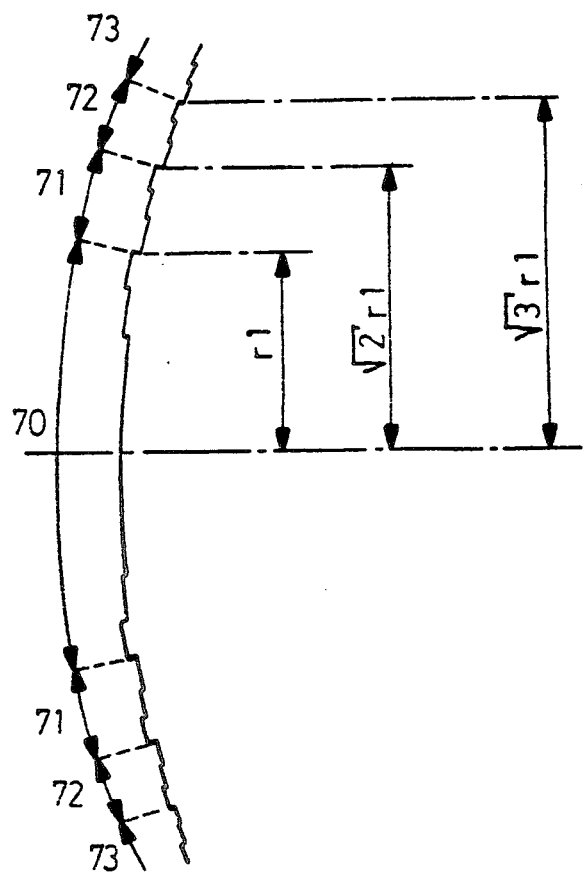
FIG._7

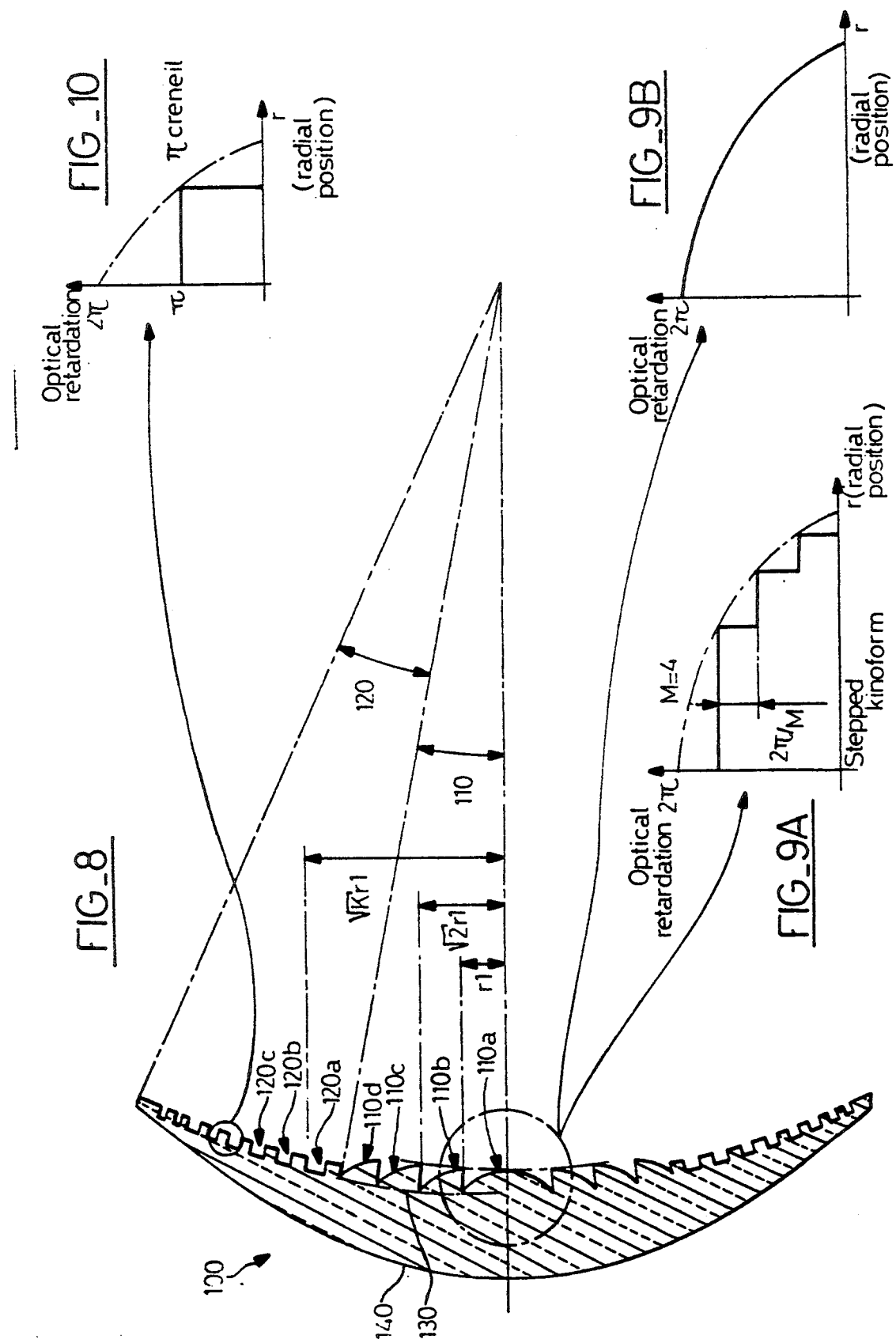

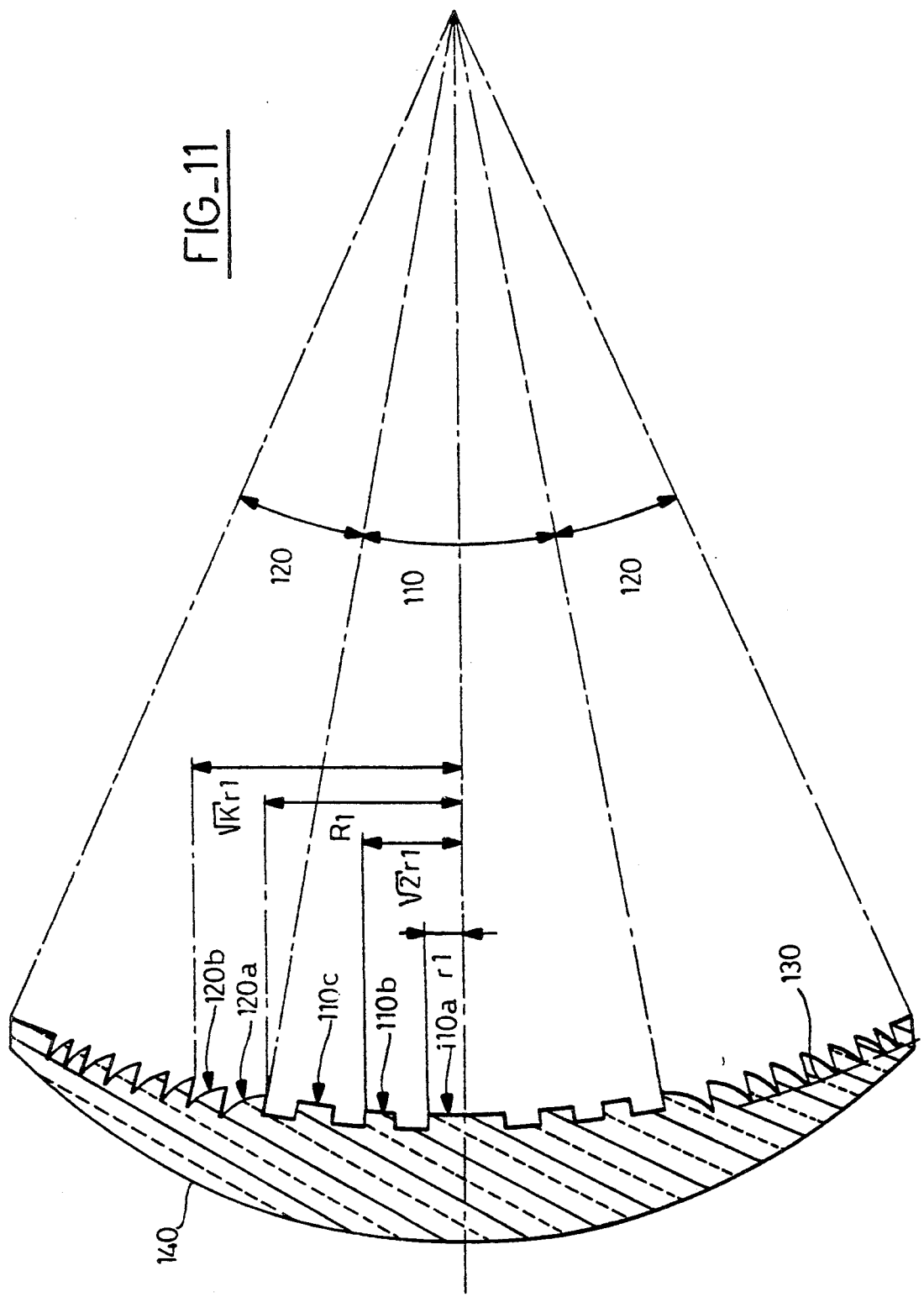
FIG_11

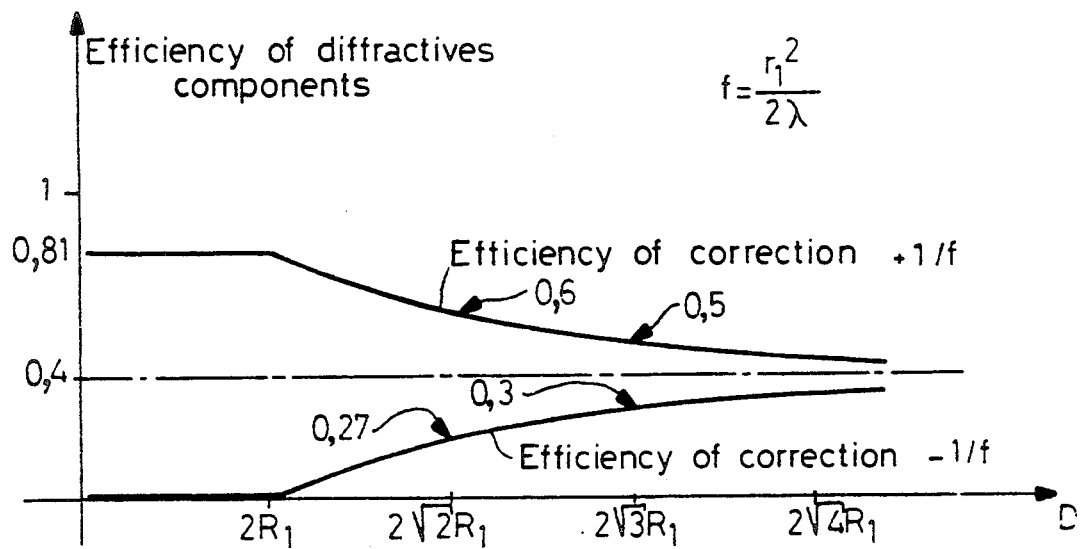
FIG_12
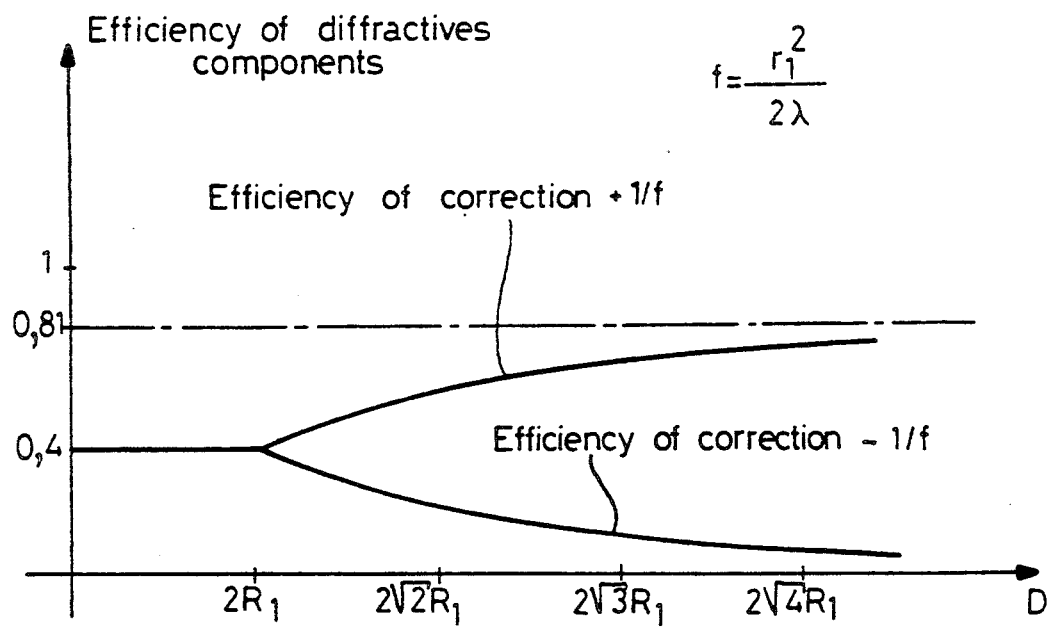
FIG_13

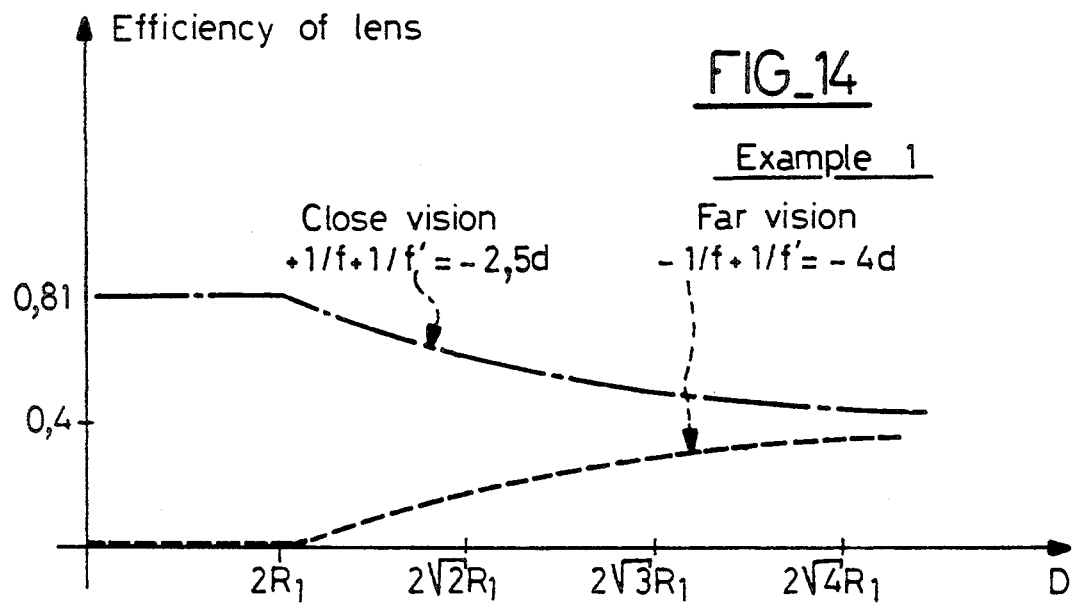
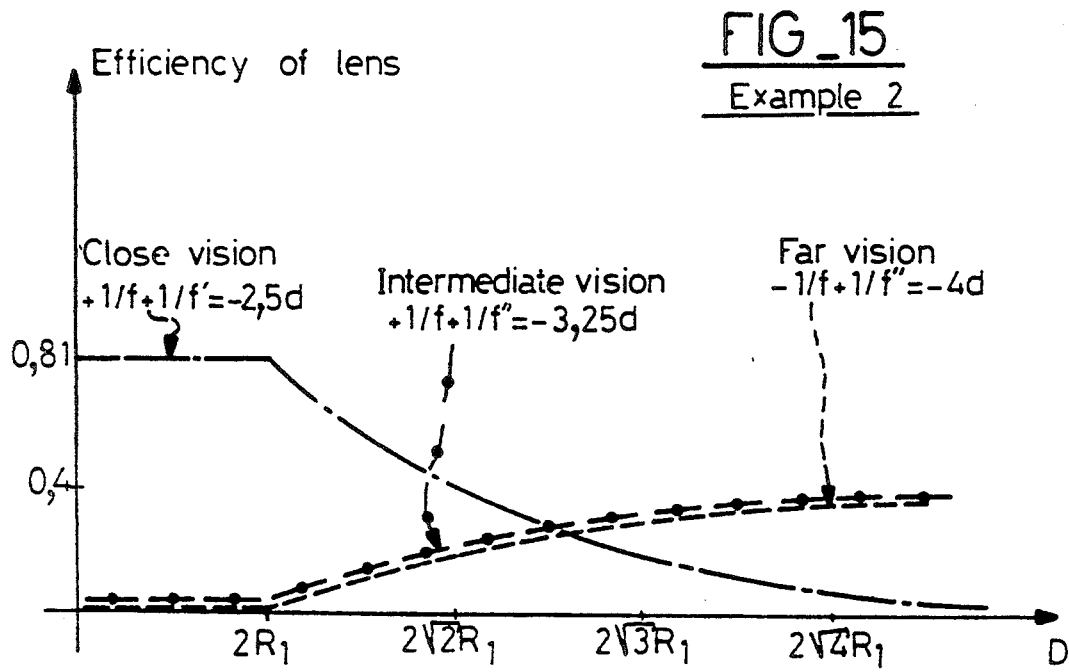

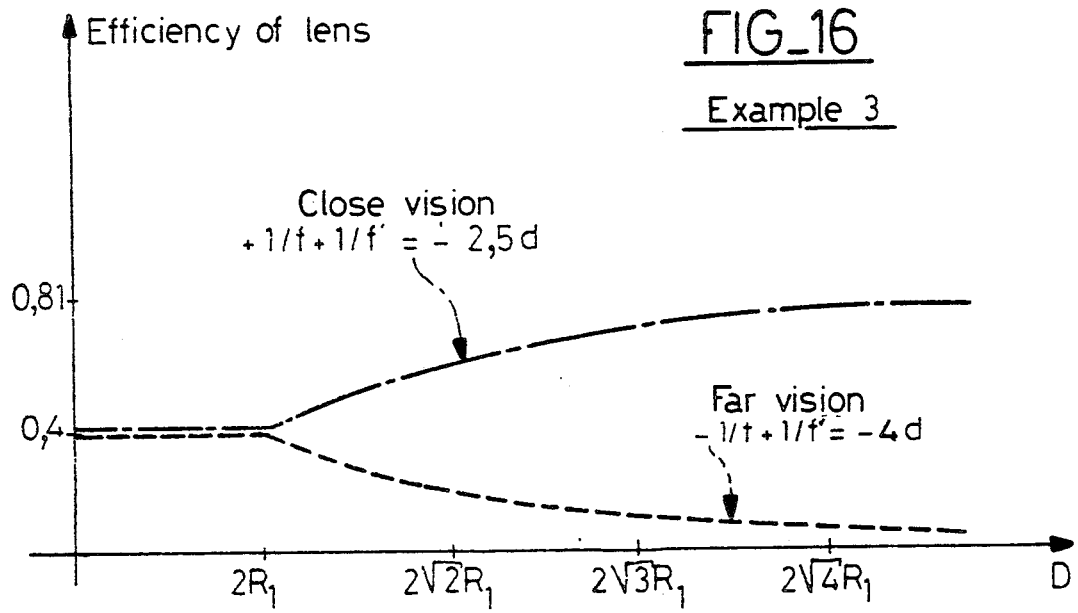
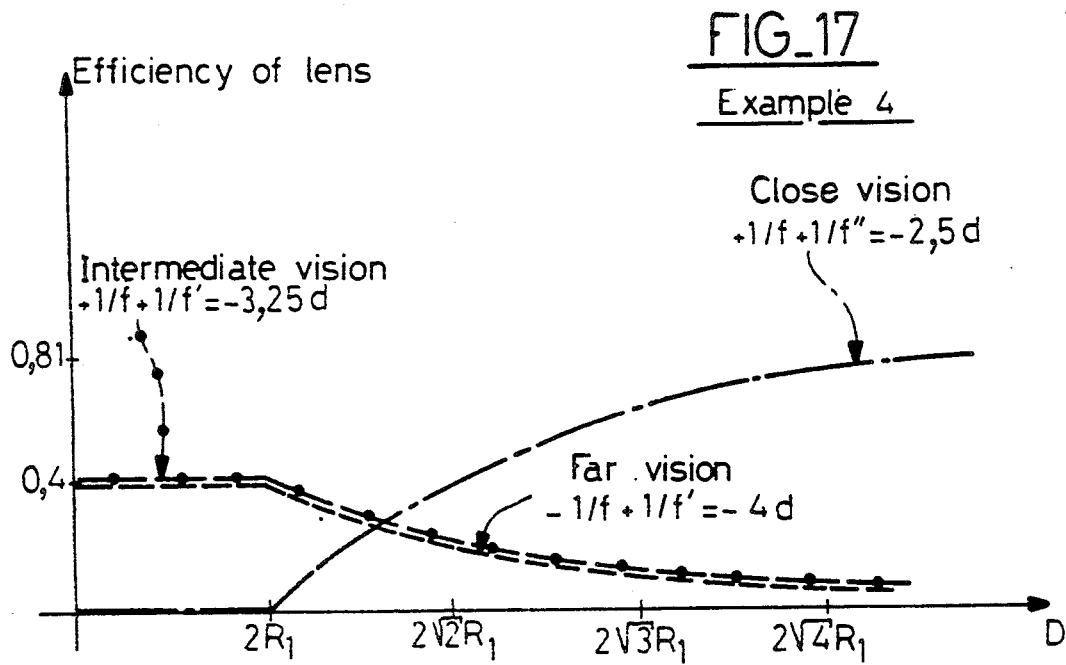

MULTIPLE CONTOUR DIFFRACTIVE LENS

BACKGROUND OF THE INVENTION

1. Field of the Invention

The present invention concerns the field of ophthalmic lenses.

It concerns, more particularly, contact lenses and intra-ocular implants. Unifocal contact lenses are designed to be placed on the cornea of the eye, and they are used to compensate for ametropias (myopia or hypertropia). By contrast, the intra-ocular implants are designed to replace the crystalline lens inside the eye.

2. Description of the Prior Art

It has been sought, for many years, to develop bifocal or multifocal contact lenses placed before the cornea, enabling compensation for the accommodation of presbyopic patients and giving the possibility of correcting long-sightedness and, at the same time, assisting the crystalline lens in close vision.

Many types of bifocal or multifocal contact lenses have already been proposed. However, none of these multiple focal lenses, proposed until now, have been entirely satisfactory.

As illustrated schematically in the appended FIGS. 1A and 1B, respectively corresponding to a front view and a lateral sectional view, the document FR-A-1 423 908 refers to a contact lens 10, formed by two regions 11, 12, possessing, on at least one face, different radii of curvature and, hence, different refractive properties, respectively adapted to close vision and far or distant vision. The use of the lens described in the document FR-A-1 423 requires a relative shift between the lens and the eye at the change from close vision to far vision, through the resting of the lens on the lower eyelid, so that the axis of vision O—O passes alternately through either of the two regions 11, 12. The appended FIGS. 2A and 2B schematically illustrate the theoretical, relative position of the lens 10 and the eye, respectively in far vision and close vision. In these FIGS. 2A and 2B, a distant object is referenced 13, a close object is referenced 14, while the retina, the natural crystalline lens and the lower eyelid are referenced 15, 16 and 17 respectively. A lens of this type does not give full satisfaction. It will be noted, in particular, that this type of lens theoretically requires a major shift of the lens 10 with respect to the eye so that the axis of vision O—O moves alternately through either of the two regions 11, 12. Consequently, the indispensable resting of the lens 10 on the lower eyelid 17, combined with the relative lens-/eye shift, make these lenses hard to bear. If, moreover, both types of correction are used simultaneously, the optical axis O—O being close to the junction between the two regions 11, 12, an unacceptable jump in vision is obtained.

It will be noted that, as shown in FIGS. 3A, 3B and 4A, 4B, respectively in front view and in a lateral sectional view, the documents U.S. Pat. Nos. 1,647,721 and 1,735,758 refer to lenses 20, 30 designed to be mounted on spectacle frames which have, similarly to the document FR-A-1 423 908, regions 21, 22 and 31, 32 having different refraction properties; however, according to the documents U.S. Pat. Nos. 1,647,721 and 1,735,758, the different refraction properties are not obtained by variation in radius of curvature, but by variation in index. More precisely, the different refraction properties are obtained by inclusion, in the body 22, 32 of the lens formed by a material with a determined index, of an element 21, 31 formed by a material with a different index. The lenses defined in the documents U.S. Pat. Nos. 1,647,721 and 1,735,758 have the same drawbacks as the lens shown in the document FR-A-1 423 908.

The prior art contact lenses, which have been described briefly above with reference to FIGS. 1 to 4, are designed to enable an alternating vision. These lenses generally make it necessary to have a ballast to keep their orientation and prevent their rotation on the eye, a ballast that forms an excess thickness which is highly irksome with respect to the wearer's comfort.

Moreover, the shift of the lens should be perfectly controlled to ensure accurate alternating vision. Now, because of different variations, which are independent of the geometry of the lens, such as palpebral pressure, the flow of the tear fluid film, etc, this shift may become uneven and uncontrolled.

To overcome these drawbacks, other contact lenses have been proposed and use the concept of simultaneous distant and close vision.

As illustrated schematically in the appended FIGS. 5A and 5B, respectively showing a front view and a lateral sectional view, the documents EP-A-1 184 490, EP-A-0 232 191, U.S. Pat. No. 4,636,049 refer to a contact lens 40, formed by two concentric regions 41, 42 having, on at least one face, different radii of curvature and, hence, different refraction properties, respectively adapted to close vision and far vision. These lenses no longer require any relative shift between the lens and the eye to go from one type of vision to another. However, a superimposition of images is observed at the transition between the two regions. Moreover, the component is very sensitive to variations in the pupil diameter and this pupil may undergo great variations in diameter depending on the luminance and on the patient. For example, if the central region 41 of the lens is assigned to close vision, when the aperture of the lens is such that it covers only the central region 41, the user cannot see a distant object properly.

The document U.S. Pat. No. 3,726,578 refers to a lens which has, similarly to the documents EP-A-0 184 490, EP-A-0 232 191 and U.S. Pat. No. 4,636,049, concentric regions having different refraction properties. However, according to the document U.S. Pat. No. 3,726,578, the different refraction properties are not obtained by variation in radius of curvature but by variation in index, namely by inclusion, in the body of the lens formed by a material of a determined lens, of an element formed by a material of a different index.

The document U.S. Pat. No. 3,339,997 refers to a lens very similar to the foregoing, but one which, using the chromatic aberration of the eye, has two concentric or non-concentric regions, with different chromatism in order to have different properties of refraction depending on the wavelength.

The documents U.S. Pat. Nos. 3,004,470, 4,162,122, 4,210,391 and 4,340,283 refer to lenses 50, 60, schematically illustrated in a front view in FIGS. 6B and 6C, no longer having only two concentric regions as advocated by the documents EP-A-0 184 490, EP-A-0 232 191 and U.S. Pat. No. 4,636,049, but a series of ring-shaped zones 51, 52; 61, 62, alternately having radii of curvature with a first value and a second value 53, 54, 63, 64 to work alternately in close vision and far vision. The alternation of zones makes it possible to do away with the problem of sensitivity to the variation of the pupil diameter (this is a definite advantage with respect to the object of the documents EP-A-0 184 490, EP-A-0 232 191 and U.S. Pat. No. 4,636,049). However, the lenses referred to in the documents U.S. Pat. Nos. 3,004,470, 4,162,122, 4,210,391 and 4,340,283 make no mention of the diffractive properties of alternating contours of this type.

The documents EP-A-0 064 812 and U.S. Pat. No. 4,637,697 refer to another type of lens, designed to achieve a bifocal correction of the eye with zone separation. For this, the lenses proposed in the documents EP-A-0 064 812 and U.S. Pat. No. 4,637,697 have a rear surface and a front surface with mean curvatures adapted to the correction needed for the distant vision of the wearer, the lens further having a hologram which gives the lens an additional diffraction power, such that the image of a near object is properly focused on the retina. According to the above-mentioned documents, the hologram may be generated within the lens or on its surface. The hologram may be generated by holographic recording. It can be generated mechanically in the form of a hologram in relief on the surface of the lens, as shown in the appended FIG. 7, i.e. in the form of a zoned system inspired by the optical system known to those skilled in the art as the SORET system.

More precisely again, the holograms in relief according to the document U.S. Pat. No. 4,637,697 are formed by concentric zones 70, 71, 72, 73, 74 of a same area, i.e. the external radii of which develop according to a geometric progression in $\sqrt{K r_1}$ where $r_1$ designates the external radius of the central zone 70, and K designates whole numbers. The phase contour of the hologram in relief is identical for all the zones 70, 71, 72, 73, 74 and is asymmetrical to further +1 order diffraction. By way of example, the phase contour of each zone 70, 71, 72, 73, 74 may be defined by a sequence of A concentric levels with different thicknesses to obtain differences in optical retardation of $2\pi/A$. According to the document EP-A-0 064 812, the hologram may be designed to be on the entire optical zone of the lens or on only a part of it. Moreover, the lens can be made with several holograms generated separately, superimposed if necessary, giving different diffraction power values. In the case of holograms in relief forming a zoned system, the obtaining of different diffraction power values takes the material form of zones consisting of concentric sub-zones, the external radii of which respond to geometric progression values that differ from one zone to the other. The use of lenses of the type referred to in the documents EP-0 064 812 and U.S. Pat. No. 4,637,697 raises problems of perception of contrasts under certain conditions of vision.

It will be noted that the document GB-A-802 918 previously described the association, in a sighting system for firearms, firstly of optical means enabling the user to see a distant target clearly and, secondly, a zoned system enabling the user to observe the fore-sight of the weapon. According to the document GB-A-802 918, the zoned system may be formed either by a transparent lens, having one of its faces formed by alternately transparent and opaque, concentric zones with the same area, or by a transparent lens formed by concentric rings of the same radial area but having, alternately, either of two optic thicknesses.

SUMMARY OF THE INVENTION

An object of the present invention is to propose a new type of bifocal or multifocal lens which removes the drawbacks of prior art lenses.

The opthalmic lens according to the present invention is characterized by the fact that it comprises at least two concentric regions possessing diffractive components with different phase contours, in order to use different orders of diffraction.

As shall be explained hereinafter, owing to the fact that the lens according to the present invention, possesses diffractive components of different phase contours distributed over concentric regions, it has a diffraction efficiency ratio, in far vision and close vision respectively, that evolves as a function of the diameter of the pupillary aperture The lens according to the present invention can therefore be better adapted to the conditions of use.

BRIEF DESCRIPTION OF THE DRAWINGS

Other characteristics, aims and advantages of the present invention will appear from the following detailed description, and in referring to the appended drawings, given as non-restrictive examples, wherein FIGS. 1(a) and (b) to 5(a) and (b), 6(a)-(c) and 7, described earlier, illustrate the prior art;

FIG. 8 shows a schematic, lateral-sectioned view of a lens according to the present invention;

FIGS. 9A and 9B show an enlarged view of the contour of the reliefs of the diffractive components of one region of the lens;

FIG. 10 shows an enlarged view of the contour of the reliefs of the diffractive components of another region of the lens;

FIG. 11 shows a sectional view of another variant of the lens according to the present invention;

FIGS. 12 and 13 represents the efficiency of the diffractive components, shown respectively in FIGS. 8 and 11, as a function of the aperture of the pupil;

FIGS. 14, 15, 16 and 17 represent the efficiency of lenses in accordance with four embodiments of the present invention.

DESCRIPTION OF PREFERRED EMBODIMENTS

As indicated previously, according to an essential characteristic, a lens 100 according to the present invention has at least two concentric regions 110, 120, possessing diffractive components with different phase contours in order to favour different orders of diffraction.

The diffractive components may be formed phase holograms by modulation of relief or index, hereinafter called relief or index holograms.

Furthermore, the diffractive, concentric regions of the lens 100, according to the present invention, may be associated with a refractive component, determined by the geometry of the lens. The refractive component is formed by the difference in radius of curvature between the two main surfaces 130, 140 of the lens. More precisely, the refractive component may have refraction power identical throughout the extent of the lens, or may have two different refraction power values, respectively facing the two concentric regions 110, 120 of diffractive components. It is again possible to contemplate the use of a refractive component having different refraction power values facing a single concentric region 110, 120 of diffractive components.

According to a preferred characteristic of the present invention, the two concentric regions 110, 120 of the lens having different phase contours, one is suited to n+1 order working and the other to n=+1 and n=−1 order working.

Should the diffractive components be formed by index holograms, these diffractive zones are formed by concentric, annular zones each having a variation of index in a radial direction, the index contour of the various annular zones being identical for a region 110 or 120 considered, but different from one region to the other.

The external radius of the above-mentioned, concentric annular zones, considered with respect to the optic axis of the lens, develops according to a geometrical progression of the type $\sqrt{k r_1}$ where K designates whole numbers, and $r_1$ designates the external radius of the central ring.

Should the diffractive components be formed by a hologram in relief, one of the faces 130 or 140 of the is formed by concentric, annular structures in relief. Each region 110, 120 is formed by at least one annular structure in relief centered on the axis of the lens. Each region 110, 120 may be formed by a large number of concentric structures in relief, referenced 110a, 110b, 110c ... for the central zone 110, and 120a, 120b, 120c ... for the peripheral zone 120 in FIGS. 8 and 11.

These structures 110a, 110b; 120a, 120b, have the same contour for one and the same region 110 or 120, but the structures in relief 110a, 110b; 120a, 120b, have different contours from one region to another. The different structures 110a, 110b; 120a, 120b all have the same area. The external radii of the different structures develop according to a geometrical progression of the type $\sqrt{K r_1}$ where $r_1$ designates the external radius of the central structure 110a, as shown in FIGS. 8 and 11 and K designates successive whole numbers.

The focal lengths $f_n$ of the diffractive component thus formed are equal to:

$$f_n = r_1^2 / 2n\lambda$$

where $r_1$ designates the external radius of the central structure 110a, n designates the order of diffraction, and λ designates the wavelength considered.

The number $N_1$ of structures 110a, 110b etc. included in the central region 110 with a diameter $D_1$ equals:

$$N_1 = D_1^2 / 4r_1^2.$$

The number $N_2$ of structures 120a, 120b ... included in the peripheral region 120 with a diameter $D_2$ equals:

$$N_2 = (D_2^2 - D_1^2) / 4r_1^2.$$

The number N of structures included in the pupillary aperture diameter D equals:

$$N = D^2 / 4r_1^2.$$

The contour of the structures 110a, 110b, 120a, 120b ... may be continuous, as illustrated in FIG. 9B. It may also be stepped, as illustrated in FIG. 9A, for example formed by M levels, phase-shifted by $2\pi/M$ generating differences of optical retardation $\lambda/M$.

The n order diffraction efficiency $E_n$ of a stepped structure of this type, formed by M levels phase-shifted by $2\pi/M$, is equal to:

$$E_n = \frac{\text{Energy in the } n \text{ order}}{\text{Incidence energy}}$$

$$E_n = \frac{(\sin \pi n/M)^2}{(\pi n/M)^2} \frac{\sin^2 \pi(1-n)}{M^2 \sin^2 \pi(1-n)/M}$$

The total diffraction efficiency $E_{ng}$ of the lens 100, having two concentric regions 110, 120 with different phase contours, corresponds to the mean of the n order diffraction efficiency $E_{n110}$, $E_{n120}$ of the regions 110, 120, contained in the pupillary aperture diameter, giving:

$$E_{ng} = \frac{N_{10} E_{n110} + N_{20} E_{n120}}{N}$$

In the above relationship, $N_{10}$ and $N_{20}$ designate the number of structures 110a, 110b; 120a, 120b of each region contained in the pupillary aperture diameter D. By way of example, if the pupillary aperture diameter D equals the diameter $D_1$ of the central region 110, then $N_{10} = N_1$ and $N_{20} = 0$.

The n=+1 order of diffraction is obtained for structures relief of the stepped kinoform lens type, as illustrated in FIG. 9A, i.e. structures having a contour formed by M levels with M greater than 2, phase-shifted by $2\pi/M$.

For example, for M=4, the n=+1 order diffraction efficiency $E_1$ is equal to 0.81, whereas it is null for the 0 and −1 orders, the remaining energy being distributed in the higher orders.

The n=+1 and n=−1 orders of diffraction are obtained simultaneously by a 0, $\pi$ crenel function (namely a function where the optical element introduces a 0 or $\pi$ retardation) type of structure generating a phase shift of $\pi$, as shown in FIG. 10, i.e. an alternation of concentric, annular zones generating relative phase shifts of $\pi$. The diffraction efficiency of 0, $\pi$ crenel structures of this type, generating a phase shift of $\pi$, is equal to 0.4 for n=+1 and n=−1 whereas the diffraction efficiency $E_n$ is null for the other n orders.

The total diffraction efficiency of a diffractive component formed, as illustrated schematically in figure 8, by a central region 110, formed by a central region 110, consisting of a kinoform lens stepped in four levels phase-shifted by 2n/4 and a peripheral region 120, formed by a 0, $\pi$ crenel function, according to the pupillary aperture diameter D, is illustrated in FIG. 12.

When the pupillary aperture diameter D is smaller than or equal to the external diameter $D_1$ ($2R_1$) of the central region 110, $N = N_{10}$ and $N_{20} = 0$, the total diffraction efficiency $E_{ng} = E_{n110}$ and hence $E_{+1g} = 0.81$ for n=+1 and $E_{ng} = 0$ for n=−1 and n=0.

In conclusion, when the pupillary aperture diameter D is smaller than or equal to the external diameter $D_1$ of the central region 110, the diffractive component has an efficiency of 0.81 for the corrective power $+1/f$ (it is recalled that $f_n = r_1^2 / 2n/$).

When the pupillary aperture diameter D is greater than the external diameter $D_1$ ($2R_1$) of the central region 110, the efficiency of the diffractive component is determined by the following relationship:

$$E_{ng} = \frac{N_{10} E_{n110} + N_{20} E_{n120}}{N}$$

hence:

-continued $$E_{+1g} = 0.4 + 0.41 \frac{D_1^2}{D^2} \text{ for } n = +1$$

$$E_{-1g} = 0.4 - 0.4 \frac{D_1^2}{D^2} \text{ for } n = -1$$

$$E_{ng} = 0 \text{ for } n = 0.$$

In other words, when the pupillary aperture diameter D is greater than the external diameter $D_1$ of the central region 110, as shown in FIG. 12, the total efficiency of the lens for the correction $+1/f$ decreases towards an asymptote at 0.4, while the total efficiency of the lens for the corrective power $-1/f$ increases towards an asymptote at 0.4.

The total diffraction efficiency $E_{ng}$ of a diffractive component of the type shown schematically in FIG. 11, consisting of a central region 100 formed by a 0, $\pi$ crenel function and a peripheral region 120 formed by a stepped kinoform lens in four levels phase-shifted by $2\pi/4$, as a function of the pupillary aperture diameter D, is illustrated in FIG. 13.

When the pupillary aperture diameter D is smaller than or equal to the external diameter $D_1(2R_1)$ of the central region 110, $N=N_{10}$ and the total efficiency $E_{ng} = E_{110}$, hence:

$E_{+1g}=0.4$ for $n=+1$, $E_{-1g}=0.4$ for $n=-1$, $E_{ng}=0$ for $n=0$.

In other words, when the pupillary aperture diameter D is smaller than or equal to the external diameter $D_1$ of the central region 110, the lens has an identical total efficiency equal to 0.4 for the corrective power values $+1/f$ and $-1/f$.

When the pupillary aperture diameter D is greater than the external diameter $D_1$ ($2R_1$) of the central region 110, the total efficiency of the lens is given by the following relationship:

$$E_{ng} = \frac{N_{10}E_{n110} + N_{20}E_{n120}}{N}$$

hence $$E_{+1g} = 0.81 - 0.41 \frac{D_1^2}{D^2} \text{ for } n = +1$$

$$E_{-1g} = 0.4 \frac{D_1^2}{D^2} \text{ for } n = -1 \text{ and}$$

$$E_{ng} = 0 \text{ for } n = 0.$$

In other words, when the pupillary aperture diameter D is greater than the external diameter $D_1$ of the central region 110, as illustrated in FIG. 13, the total efficiency of the lens for the correction power value $+1/f$ increases towards an asymptote at 0.81, while the total efficiency of the lens for the corrective power $-1/f$ increases towards 0.

We shall now describe four examples of lenses in accordance with the present invention.

EXAMPLE 1

It is desired to make a lens having a corrective power value, for close vision, of $P_P=2.5$ diopters, furthered under high luminance and kept at a minimum threshold under low luminance, and a corrective power value, for far vision, of $P_L=-4$ diopters furthered under low luminance.

The lens meeting these criteria comprises:

a refractive lens of constant power $1/f'=3.25$ diopters, and, a diffractive component with power $1/f=0.75$ diopter, of the type illustrated in the appended FIG. 8, comprising a central region 110 formed by stepped kinoform lens in M levels (4 levels for example) and a peripheral region 120, formed by a 0, $\pi$ crenel function.

The central region 110 of the diffractive component works in the $+1$ order. It gives a focal length $+f$ with a diffraction efficiency $E_{1g}=0.81$. The corrective power of the central region 110 of the lens, the only region active at high luminance, is therefore: $1/f+1/f'=0.75=-3.25=-2.50$ diopters with a constant efficiency.

The peripheral region 120 of the diffractive component, active under low luminance, works in both the $n=+1$ and $n=-1$ orders with the efficiency $E_{+1g}=0.4$ and $E_{-1g}=0.4$. It gives the two focal lengths $+f$ and $-f$ with a diffraction efficiency of 0.4.

The peripheral region therefore gives two corrective power values:

$1/f+1/f'=0.75-3.25=-2.50$ diopters, and $-1/f+1/f'=-0.75-3.25=-4$ diopters.

The efficiency of these two corrections is constant and equal to 0.4 for the peripheral region 120 alone. In considering the lens 100, the efficiency ratings of these two corrections ($-2.5$ and $-4$ diopters) decrease and increase respectively with the pupillary aperture diameter D, starting from D greater than $D_1$.

The efficiency of the correction in close vision and far vision thus obtained is illustrated in the appended FIG. 14. FIG. 14 shows that the lens conforming to this first example does further close vision at high luminance while, at the same time, maintaining a correction threshold, in close vision, at low luminance, on the one hand, and enables far vision at low luminance on the other hand.

EXAMPLE 2

It is desired to make a lens having a corrective power value, for close vision, of $P_P=-2.5$ diopters, furthered under high luminance, a corrective power value, for intermediate-range vision, of $P_I=-3.25$ diopters, furthered under low luminance, and a corrective power value, for far vision, of $P_L=-4$ diopters, furthered under low luminance.

The lens meeting these criteria comprises:

a refractive component with a central region having a power of $1/f'=-2.875$ diopters and a peripheral region with a power of $1/f''=-3.625$ diopters, and a diffractive component with a power $1/f=0.375$ diopters, of the type shown in FIG. 8, having a central region 110, formed by a stepped kinoform lens with four levels and a peripheral region 120 formed by a 0, $\pi$ crenel function.

The central and peripheral regions of the refractive component and of the diffractive component are respectively placed in facing position, i.e. they have identical external radii.

The central region 110 of the diffractive component works in the +1 order. It gives a focal length +f with a diffraction efficiency of $E_{1g}=0.81$. The corrective power of the central region 110 of the lens is therefore: $1/f + 1/f' = 0.375 - 2.875 = 2.50$ *diopters* with constant efficiency.

The peripheral region of the diffractive component works in both $n=+1$ order and $n=-1$ order, with efficiency $E_{+1g}=0.4$ and $E_{-1g}=0.4$. It gives the two focal lengths $+1$ and $-1$ with a diffraction efficiency of 0.4.

The peripheral region 120 therefore gives two corrective power values:

$1/f + 1/f' = 0.375 - 3.625 = -3.25$ *diopters*, and $-1/f + 1/f' = -0.375 - 3.625 = -4$ *diopters*.

The efficiency of these two corrections is constant and equal to 0.4 for the peripheral region 120 alone. In considering the total lens, the efficiency of these two corrections, $-3.25$ diopters and $-4$ diopters, which respectively correspond to the correction required for intermediate-range vision and far vision, increases with the pupillary aperture diameter D, starting from D greater than $D_1$.

The efficiency of the lens for close vision, intermediate-range vision and far vision, as a function of the pupillary aperture diameter, D, is shown schematically in FIG. 15. This figure shows that the lens corresponds to the requisite conditions, namely, close vision furthered under high luminance, and intermediate-range and far vision furthered under low luminance.

EXAMPLE 3

It is desired to make a lens having a corrective power value, for close vision, of $P_P = -2.5$ diopters, kept at a minimum threshold under high luminance and furthered under low luminance, and a corrective power value, for far vision, of $P_L = -4$ diopters, furthered under high luminance.

The lens meeting these criteria comprises:

a refractive lens with constant power $1/f = 3.25$ diopters, and a diffractive component with a power $1/f = 0.75$ diopters, of the type shown in the appended FIG. 11, consisting of a central region 110, formed by a 0, $\pi$ crenel function and a peripheral region 120 formed by a stepped kinoform lens with M levels (4 levels for example).

The central region 110 of the diffractive component works in the $n=+1$ and $n=-1$ orders, with the efficiency $E_{+1g}=0.4$ and $E_{-1g}=0.4$. It gives two focal lengths $+f$ and $-f$ with a diffraction efficiency $E_{1g}=0.4$.

$1/f + 1/f' = 0.75 - 3.25 = -2.50$ *diopters*, and $-1/f + 1/f' = -0.75 - 3.25 = -4$ *diopters*.

The efficiency of these two corrections, $-2.50$ diopters and $-4$ diopters, is constant and equal to 0.4 for the central region 110.

The peripheral region 120 of the diffractive component works in order $+1$. It gives a focal length $+f$ with a diffraction efficiency $E_{+1g}=0.81$. The corrective power of the peripheral region 120 of the lens is therefore:

$1/f + 1/f' = 0.75 - 3.25 = 2.50$ *diopters* with a constant efficiency of 0.81.

Taking the total lens, this correction of $-2.50$ diopters thus increases with the pupillary aperture diameter D, starting from D greater than $D_1$.

FIG. 16, which gives a schematic illustration of the efficiency of the lens for corrective power values in close vision and far vision, shows that the lens according to the foregoing third example meets the requisite criteria, namely close vision kept at a threshold in high luminance and furthered in low luminance and far vision furthered in high luminance.

EXAMPLE 4

It is desired to make a lens having a corrective power value, for close vision, of $P_P = -2.50$ diopters, furthered under low luminance, a corrective power value, for intermediate-range vision, of $P_I = -3.25$ diopters, furthered under high luminance, and a corrective power value, for far vision, of $P_L = -4$ diopters, furthered under high luminance.

The lens meeting these criteria comprises:

refractive component comprising a central region with a power value of $1/f = -3.625$ diopters and a peripheral region with a power value of $1/f = 2.875$ diopters, and, a diffractive component with a power value $1/f = 3.75$ diopters of the type shown in the appended FIG. 11, having a central region 110 formed by a stepped kinoform lens with four levels and a peripheral region 120 formed by a 0, $\pi$ crenel function.

The central region and the peripheral region of the refractive component and of the diffractive component are respectively placed facing each other, i.e. they have identical external radii.

The central region 110 of the diffractive component works in the $n=+1$ and $n=-1$ orders with efficiency $E_{+1g}=0.4$ and $E_{-1g}=0.4$. It gives two focal lengths $+f$ and $-f$ with a diffraction efficiency of 0.4. This central region 110 of the lens thus gives two corrective power values:

$1/f + 1/f' = 0.375 - 3.625 = -3.25$ *diopters*, and $-1/f + 1/f' = -0.375 - 3.625 = -4$ diopters.

The efficiency of these two corrections, $-3/25$ diopters and $-4$ diopters, is constant and equal to 0.4 for the central region 110.

The peripheral region 120 of the diffractive component works in the $+1$ order. It gives a focal length $+f$ with a diffraction efficiency $E_{+1g}=0.81$. The corrective power of the peripheral region of the lens is therefore:

$1/f + 1/f' - 0.375 - 2.875 = 2.5$ *diopters*

The efficiency of this $-2.5$ diopter correction is constant and equal to 0.81 for the peripheral region 120 alone. Considering the total lens, the efficiency of this correction of $-2.5$ diopters increases towards 0.81 with a pupillary aperture diameter D, starting from D greater than $D_1$.

The appended FIG. 17, which gives a schematic view of the correction efficiency of the lens in close vision, intermediate-range vision and far vision, shows that the lens according to the fourth example meets the above-mentioned criteria, namely: close vision furthered under low luminance as well as intermediate-range vision and far vision furthered under high luminance.

The hologram needed to make the diffractive component, having two different phase contours in accordance with the present invention, may be generated by any means known per se to those skilled in the art, notably by etching, molding or recording.

Of course, the present invention is not restricted to the embodiments that have just been described, but be extended to any variants that are in accordance with its spirit.

What is claimed is:

1. An opthalmic lens comprising at least two concentric regions having diffractive components with different phase contours in order to use different orders of diffraction, wherein the diffractive components are formed by annular and concentric structures in relief on one of the faces of the lens, the contour of the various structures in relief being identical for a considered region, but different from one region to another, and the external radius of the structures in relief, considered with respect to the optical axis of the lens, corresponds to a geometrical progression of the type $\sqrt{Kr_1}$ where k designates whole numbers and r1 designates the external radius of the central structure.

2. A lens according to claim 1 wherein the lens has two main surfaces having different radii of curvature, in which the difference between said radii form a refractive component.

3. A lens according to claim 2, wherein the refractive component possesses a refractive power identical throughout the extent of the lens.

4. A lens according to claim 2, wherein the refractive component has at least two different refraction power values, respectively facing the concentric regions of the diffractive components having a same phase contour.

5. A lens according to claim 2, wherein the refractive component has at least two different refraction power values, facing a region of diffractive components having a same phase contour.

6. A lens according to claim 1, wherein the concentric regions of diffractive components having different phase contours are adapted to working, respectively, one in the $n=+1$ order and the other in the $n=+1$ and $n=-1$ orders.

7. A lens according to claim 1, wherein the concentric regions of diffractive components having different phase contours, are respectively formed, one by a stepped kinoform lens with M levels phase-shifted by $2\pi/M$ with $M>2$ the other with crenels in $\pi$.

8. A lens according to claim 1, formed by an intraocular implant designed to replace the crystalline lens.

9. A lens according to claim 1, formed by a contact lens designated to be placed on the cornea of the eye to assist the crystalline lens in close vision.

10. An opthalmic lens comprising at least two concentric regions having diffractive components with different phase contours in order to use different orders of diffraction wherein the diffractive components are formed by concentric rings having a variation in index in the radial direction, the index contour of the various concentric, annular zones being identical for a considered region, but different from one region to another.

11. A lens according to claim 10, wherein the external radius of the concentric, annular structures, considered with respect to the optical axis of the lens, corresponds to a geometrical progression of the type $\sqrt{Kr_1}$ where K designates whole numbers and r1 designates the external radius of the central structure.

12. A lens according to claim 10, wherein said lens has two main surfaces having different radii of curvature in which the difference between said radii form a refractive component.

13. A lens according to claim 12, wherein the refractive component possesses a refractive power identical throughout the extent of the lens.

14. A lens according to claim 12, wherein the refractive component has at least two different refraction power values, respectively facing the concentric regions of the diffractive components having a same phase contour.

15. A lens according to claim 12, wherein the refractive component has at least two different refraction power values, facing a region of diffractive components having a same phase contour.

16. A lens according to claim 10, wherein the concentric regions of diffractive components having different phase contours are adapted to working, respectively, one in the $n=+1$ order and the other in the $n=+1$ and $n=-1$ orders.

17. A lens according to claim 10, formed by an intraocular implant designed to replace the crystalline lens.

18. A lens according to claim 10, formed by a contact lens designed to be placed on the cornea of the eye to assist the crystalline lens in close vision.

19. Opthalmic lens comprising at least two concentric regions having diffractive components with different phase contours in order to use different orders of diffraction, wherein the concentric regions of diffractive components having different phase contours are adapted to working, respectively, one in the $n=+1$ order and the other in the $n=+1$ and $n=-1$ order.

20. A lens according to claim 19, wherein the diffractive components are formed by annular and concentric structures in relief on one of the faces of the lens, the contour of the various structures in relief being identical for a considered region, but different from one region to another, and wherein the external radius of the structures in relief, considered with respect to the optical axis of the lens, corresponds to a geometrical progression of the type $\sqrt{Kr1}$ where K designates whole numbers and r1 designates the external radius of the central structure.

21. A lens according to claim 19, wherein the diffractive components are formed by concentric rings having a variation in index in the radial direction, the index contour of the various concentric, annular zones being identical for a considered region, but different from one region to another, and wherein the external radius of the concentric, annular structures, considered with respect to the optical axis of the lens, corresponds to a geometrical progression of the type $\sqrt{Kr1}$ where K designates hole numbers and r1 designates the external radius of the central structure.

22. A lens according to claim 19 wherein the lens has two main surfaces having different radii of curvature in which the difference between said radii of curvature form a refractive component for said lens.

23. A lens according to claim 22, wherein the refractive component possesses a refractive power identical throughout the extent of the lens.

24. A lens according to claim 22, wherein the refractive component has at least two different refraction power values, respectively facing the concentric regions of the diffractive components having a same phase contour.

25. A lens according to claim 22, wherein the refractive component has at least two different refraction power values, facing a region of diffractive components having a same phase contour.

26. A lens according to claim 19, wherein the concentric regions of diffractive components having different phase contours, are respectively formed, one by a stepped kinoform lens with M levels phase-shifted by $2\pi/M$ with $M>2$, the other with crenels in $\pi$.

27. A lens according to claim 19, formed by an intraocular implant designated to replace the crystalline lens.

28. A lens according to claim 19, formed by a contact lens designed to be placed on the cornea of the eye to assist the crystalline lens in close vision.

29. Opthalmic lens comprising at least two concentric regions having diffractive components with different phase contours in order to use different orders of diffraction, wherein the concentric regions of diffractive components having different phase contours, are respectively formed, one by a stepped kinoform lens with M levels phase-shifted by $2\pi/M$ with $M>2$, the other with crenels $\pi$.

30. A lens according to claim 29, wherein the diffractive components are formed by annular and concentric structures in relief, on one of the faces of the lens, the contour of the various structures in relief being identical for a considered region, but different from one region to another, wherein the external radius of the structure in relief, considered with respect to the optical axis of the lens, corresponds to a geometrical progression of the type $\sqrt{Kr1}$ where K designates whole numbers and r1 designates the external radius of the central structure.

31. A lens according to claim 29 wherein the lens has two main surfaces having different radii of curvature in which the difference between said radii of curvature form a refractive component.

32. A lens according to claim 31, wherein the refractive component possesses a refractive power identical throughout the extent of the lens.

33. A lens according to claim 31, wherein the refractive component has at least two different refraction power values, respectively facing the concentric regions of the diffractive components having a same phase contour.

34. A lens according to claim 31, wherein the refractive component has at least two different refraction power values, facing a region of diffractive components having a same phase contour.

35. A lens according to claim 29, wherein the concentric regions of diffractive components having different phase contours are adapted to working, respectively, one in the $n=+1$ order and the other in the $n=+1$ and $n=-1$ orders.

36. A lens according to claim 29, formed by an intraocular implant designated to replace the crystalline lens.

37. A lens according to claim 29, formed by a contact lens designed to be placed on the corner of the eye to assist the crystalline lens in close vision.

* * * * *

UNITED STATES PATENT AND TRADEMARK OFFICE
CERTIFICATE OF CORRECTION

PATENT NO. : 5,114,220
DATED : May 19, 1992
INVENTOR(S) : Baude, et. al.

It is certified that error appears in the above-indentified patent and that said Letters Patent is hereby corrected as shown below:

col. 05, line 01    delete "n+1"    insert --n = +1-- col. 05, line 13    delete "$\sqrt{kr_i}$"    insert --$\sqrt{Kr_i}$ --

Signed and Sealed this

Ninth Day of November, 1993

Attest:

BRUCE LEHMAN

*Attesting Officer*    *Commissioner of Patents and Trademarks*